United States Patent [19]

Rosen et al.

[11] 4,096,427
[45] Jun. 20, 1978

[54] NUTATION DAMPING IN DUAL-SPIN STABILIZED DEVICES

[75] Inventors: Harold A. Rosen, Santa Monica; Jeremiah O. Salvatore, Redondo Beach, both of Calif.

[73] Assignee: Hughes Aircraft Company, Culver City, Calif.

[21] Appl. No.: 624,342

[22] Filed: Oct. 21, 1975

[51] Int. Cl.$^2$ ............................................. B64C 17/02
[52] U.S. Cl. .................................... 318/648; 244/170
[58] Field of Search ............... 318/648, 649, 580, 584; 244/170

[56] References Cited

U.S. PATENT DOCUMENTS 3,695,554  10/1972  Phillips .................................. 244/170
3,830,447   8/1974  Phillips .................................. 244/170

Primary Examiner—Robert K. Schaefer
Assistant Examiner—John J. Felbhaus
Attorney, Agent, or Firm—Noel B. Hammond; W. H. MacAllister

[57] ABSTRACT

A motor active nutation damping system employing a rotor mounted accelerometer, a platform/rotor relative rate sensor, a despin motor and a controller. In the presence of nutation, the accelerometer senses a sinusoidal acceleration whose amplitude is proportional to nutation angle and whose frequency is rotor nutation frequency, i.e., the rate at which the transverse angular momentum vector appears to rotate in rotor fixed coordinates. The controller multiplies the filtered accelerometer signal by a square wave at relative rate generated by the relative rate sensor to obtain a signal consisting of sinusoids at platform nutation frequency and higher order frequencies. Since platform nutation frequency is the rate at which the transverse angular momentum vector appears to rotate in platform fixed coordinates, spin axis torque appropriately phased at this frequency and applied to a dynamically imbalanced platform generates a transverse reaction torque that reduces the transverse angular rate associated with nutation. The controller accomplishes this function by appropriately filtering and amplifying the modulated signal, and then commanding a torque to the despin motor proportional to the resulting signal.

4 Claims, 6 Drawing Figures

NUTATION DAMPING IN DUAL-SPIN STABILIZED DEVICES

BACKGROUND OF THE INVENTION

The present invention relates to an active nutation damping control system for dual-spin stabilized devices or bodies in which a sensor senses nutation directly and damps it by activation of the despin motor.

The invention is useful with any dual-spin stabilized device or body whether it is of a stable configuration or not. By dual-spin stabilized device is meant a stabilized device having a spinning portion or rotor, and a despun portion or platform, the two portions being coupled together by a despin motor and bearing assembly. In an unstable dual-spin stabilized device, the spin moment of inertia of the rotor in relation to the combined transverse moment of inertia of the device is less than one or unity, and in a stable configuration the spin moment of inertia of the rotor in relation to the combined transverse moment of inertia of the device is greater than one or unity.

The invention is useful with spin-stabilized devices or vehicles operable in differing environments in differing operational modes, such as a fluid-supported mode of operation as by means of an air bearing, a zero gravity mode of operation or other defined or random mode of operation. Devices or vehicles of this general character are employed in applications ranging from the laboratory to outer space. In the laboratory such devices or vehicles are usefully employed as environmental test beds, duplicating the essential modes of environmental operation, including force suspension which provides spatial freedom, providing a basis for testing or proving spin stability, attitude control and the performance of instrumentation, etc. In operation in space, such devices or vehicles are useful as communication links and as scientific devices for gathering and transmitting information as to physical conditions.

A spin-stabilized body exhibits certain types of troublesome motions called wobble, precession, or nutation. All such motions tend to result in a displacement of the body's geometric axis from its intended mission orientation or attitude. Nutation of a satellite, or the coning motion of the bearing or spin axis about the total angular momentum vector, may result from any of the following disturbances: (1) booster final stage angular motion, (2) operation of the separation equipment, (3) bombardment by micrometeorites, (4) operation of payload components with uncompensated momentum, and (5) operation of mass expulsion devices on the spin stabilized devices.

In general, nutation may be reduced by energy absorbing or momentum transfer devices operable on either or both of the transverse axes to attenuate the nutation.

In one type of prior art system, nutation is damped by means of the despin control system. The despin control system operates to control the despin motor to keep the platform stably pointed in a predetermined direction, and because nutation introduces an attitude error signal, the despin control system will also damp the nutation. However, in this system the attitude sensors only weakly sense nutation as a second-order effect, and the primary design of the system must satisfy the despin requirements having to do with the pointing of the platform toward a particular direction, rather than satisfying nutation damping requirements.

A second type of system provides active nutation damping by appropriately phased thruster pulses. Such a system is shown in the paper entitled, "An On-Board, Close-Loop, Nutation Control System for a Spin-Stabilized Spacecraft," by Lynn H. Grasshoff, published in the May 1968 edition of The Journal of Spacecraft and Rockets, Volume 5, No. 5. This prior art system has the disadvantage that its operation results in attitude (angular momentum) perturbation and propellant consumption.

A third type of prior art system employs passive nutation damping by platform-mounted nutation dampers such as eddy current dampers having a pendulum. Such passive dampers have a damping performance and linear range of operation that can degrade significantly with platform spin rate or off nominal rotor spin rates. As the nutation increases to a certain point, the pendulum hits the stops and the damper is ineffective.

Accordingly, it is an object of the present invention to provide a nutation damping system which takes maximal advantage of the platform dynamic imbalance to damp nutation while only weakly coupling the despin attitude or pointing function with the nutation control function.

Another object of the invention is to provide a nutation damping system that is self-tuning, in that it can apply optimally phased torque over a wide range of platform spin rates or off nominal rotor spin rates.

A further object of the invention is to provide a nutation damping system whose performance degrades gradually and predictably under saturated conditions.

A still further object of the invention is to provide a nutation damping system whose weight is significantly less than a passive nutation damper for similar performance.

An even further object of the present invention is the provision of a nutation damping system that does not depend upon the use of thrusters so that it requires no propellant and does not perturb the attitude of the spinning body.

SUMMARY OF THE INVENTION

In accordance with these and other objects of the invention there is provided a dual-spin body having a stationary platform coupled to a spinning rotor by means of a despin control motor and bearing assembly. A sensor is provided to sense the relative rate of rotation of the rotor and the despun platform. A sensor is also provided to directly sense nutation. A controller circuit receives the output of the nutation sensor and filters it. The controller circuit multiplies the filtered nutation signal by a square wave at relative rate generated by the relative rotation rate sensor to obtain a signal consisting of sinusoids at platform nutation frequency and higher order frequencies. The controller circuit filters and amplifies the modulated signal and then applies it to the despin motor to provide a torque proportional to the resulting signal.

BRIEF DESCRIPTION OF THE DRAWINGS

The foregoing and other objects and features of the present invention can be more readily understood with reference to the following detailed description taken in conjunction with the accompanying drawings, wherein like reference numerals designate like structural elements and in which.

DETAILED DESCRIPTION OF THE INVENTION

Figure 1:
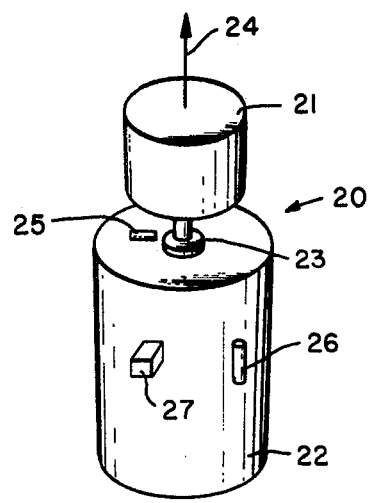
FIG. 1 is a representation of a dual-spin body constructed in accordance with the present invention.

Referring now to the drawings, FIG. 1 illustrates an embodiment of the invention in which there is shown a dual-spin stabilized device or body indicated generally at 20. It has a despun platform 21 which is coupled to a rotor 22 by means of a despin motor 23. The "platform" 21 may be a body or member of any shape, an antenna for example. Although the platform 21 is referred to as despun, it may be rotating with respect to the rotor 22. The Z axis or spin axis is illustrated by the arrow 24. A relative rate sensor 25 is disposed on the spin stabilized device 20 and generates a signal indicative of the relative rate of the rotation of the rotor 22 with respect to the despun platform 21. The relative rate sensor 25 includes circuitry which generates a square wave in response to pulses or pips produced by the relatively rotating bodies.

Also disposed on the dual-spin stabilized device 20 is a nutation sensor 26, which, in the present embodiment, may be an accelerometer disposed on the rotor 22 and having its sensing axis parallel to the spin axis 24, but displaced away therefrom. In this manner, when the dual-spin stabilized device 20 nutates, the nutation sensor 26 generates a signal proportional to that nutation. A controller 27 is also disposed on the rotor 22 of the dual-spin stabilized device.

The relative rate sensor 25 and the nutation sensor 26 may be found already installed on the spin stabilized device 20 as a part of the despin attitude or pointing system.

Figure 2:
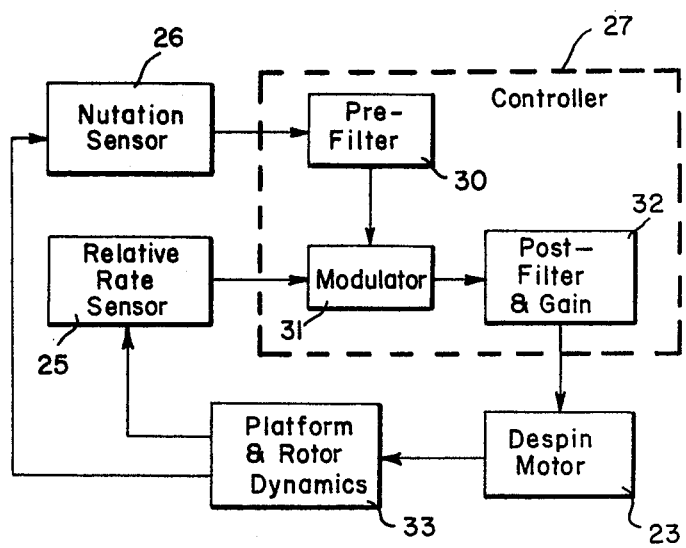
FIG. 2 is a schematic diagram indicating the interconnection of the various elements of the damping control system of the present invention.

Referring now to FIG. 2, there is shown a schematic diagram indicating the interconnection of the elements of the damping control system of the present invention. The controller 27 includes a prefilter 30 which is coupled to a modulator 31. The output of the modulator 31 is coupled to a post filter and gain circuit 32. As shown in FIG. 2, the despin motor 23 drives the platform and rotor dynamics 33, which in turn drives the nutation sensor 26 and the relative rate sensor 25. The output of the nutation sensor 26 is coupled to the prefilter 30, and the output of the relative rate sensor 25 is coupled to the input of the modulator 31. The post filter and gain circuit 32 is coupled to the despin motor 23.

In the presence of nutation, the nutation sensor 26 senses a sinusoidal acceleration whose amplitude is proportional to the nutation angle and whose frequency is rotor nutation frequency, that is, the rate at which the transverse angular momentum vector appears to rotate in rotor fixed coordinates. The modulator 31 multiplies the filtered nutation sensor signal by a square wave at relative rate generated by the relative rate sensor 25 to obtain a signal consisting of sinusoids at platform nutation frequency and higher order frequencies. Since platform nutation frequency is the rate at which the transverse angular momentum vector appears to rotate in platform fixed coordinates, torque appropriately phased at this frequency and applied to a dynamically imbalanced platform can generate a transverse reaction torque that reduces the transverse angular rate associated with nutation. The controller 27 accomplishes this function by appropriately filtering and amplifying the modulated signal and then commanding a torque to the motor 23 proportional to the resulting signal.

Figure 3:
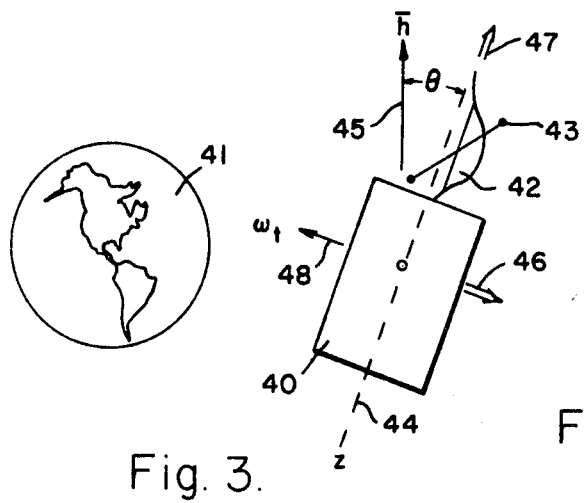
FIG. 3 is a diagram illustrating the operation of the invention under a first condition.
Figure 4:
FIG. 4 is a diagram illustrating the operation of the invention under a second condition.
Figure 4:
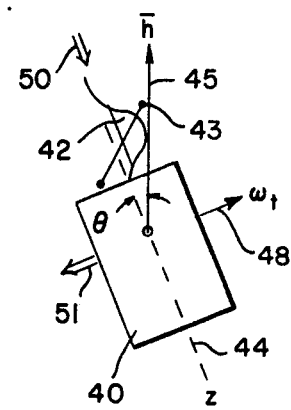

The operation of the nutation damping system of the present invention is illustrated in FIGS. 3 and 4. These figures illustrate an embodiment of the invention in which the dual-spin stabilized device is a spacecraft 40 in orbit around the earth 41. In this case the spacecraft 40 is the rotor and an antenna 42 is the despun platform. It is desired that the spacecraft 40 point the antenna 42 toward the earth 41. In the present case it is assumed that the despun platform having the antenna 42 has a dynamic imbalance which may be due to an unsymmetrical mass distribution on the platform, or the like. The dynamic imbalance or product of inertia is illustrated as a skew dumbbell 43 in the boresight plane of the antenna 42, which is nominally oriented toward earth 41. In the presence of nutation, the spin axis or Z axis 44 cones around the angular momentum vector 45 at inertial nutation frequency, which is equal to the platform nutation frequency if the platform is despun. The spin axis 44 and angular momentum vector 45 each pass through the center of mass, shown in FIGS. 3 and 4 as a small circle. In FIG. 3 where the antenna 42 leans backward, a platform spinup torque causes the platform product of inertia to react against the motion by generating a transverse torque along a line away from the earth 41, as indicated by arrow 46. The platform spinup torque is indicated by arrow 47. Since the transverse angular rate indicated by arrow 48 is earth oriented at this time, such reaction tends to reduce the nutation angle.

When the antenna leans forward 180° later in the nutation cycle as shown in FIG. 4, a despin torque, indicated by arrow 50, is required to generate the same effect. In this case the transverse angular rate, indicated by the arrow 48, is oriented away from the earth 41, and the platform despin torque causes the product of inertia to react against the motion by generating a transverse torque towards the earth 41, as indicated by arrow 51. When the antenna 42 leans east or west, the reaction torque is always orthogonal to the transverse rate and no torque is desirable at this time. Thus, to damp nutation, the sinusoidal spin torque at platform nutation frequency must be phased such that peak spinup torque occurs when the transverse rate is along the boresight of the antenna 42, for the example shown.

Figure 5:
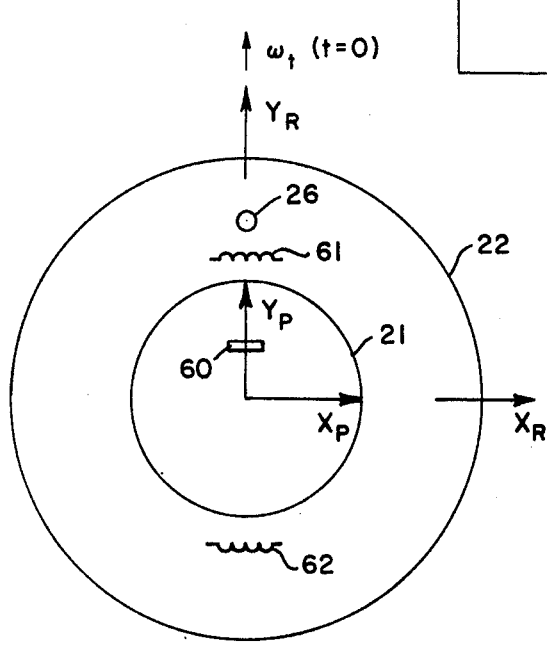
FIG. 5 is a diagram illustrating the angular relationships of components of the nutation control system of the present invention.

The method for generating the sinusoid with the proper frequency and phase is illustrated in FIG. 5, which shows a representation of the despun platform 21 and the rotor 22, along with the nutation sensor 26, which may be the accelerometer referred to previously. The relative rate sensor 25 is comprised of a magnet 60 disposed on the despun platform 21 and coils 61 and 62 disposed on the rotor 22.

The fixed transverse axis of the platform 21 and rotor 22 are aligned at some reference time ($t = 0$). The platform dynamic imbalance, platform magnet 60 and rotor coils 61, 62 of the relative rate sensor 25, and nutation sensor 26 are located in the YZ plane at $t = 0$, i.e., zero crossing of the square wave generated by the relative rate sensor 25. The transverse rate is oriented along Y at $t = 0$ for convenience with no loss in generality. These conditions correspond to the conditions illustrated in FIG. 3 where the square wave at relative rate is initiated when the antenna 42 leans backwards. The required control law, then, is a cosine spin torque. The nutation sensor 26 has the property that it senses maximum or minimum acceleration when the transverse rate points along its radial. Therefore, the signal is a cosine proportional to nutation angle $\theta$. The two pulses generated by platform magnet 60 and rotor coils 61, 62 are used by the controller 27 to generate a square wave. The controller 27 modulates the nutation sensor signal waveform by the square wave to generate a sine wave proportional to nutation angle $\theta$ at the required platform nutation frequency plus higher frequency terms. The latter are filtered out by the post filter 32 of the controller 27. Since a cosine is required for application of torque, a 90° electrical phase is required. Platform nutation frequency is typically approximately 0.25 Hz so that implementation of this phase shift does not compromise the self-tuning property of the nutation control loop. If desired, this phase shift may be accomplished by displacing the nutation sensor 26 90° with respect to the coils 61, 62. In either mechanization, the controller 27 amplifies the properly phased sinusoid in the post filter and gain circuit 32, and the applied motor torque is proportional to the resulting signal.

The performance of the device can be evaluated in straightforward manner.

PLATFORM COORDINATES: $w_{x_p} = -w_T \sin \lambda_p \tau$, $w_{y_p} = +w_T \cos \lambda_p \tau$ where $\lambda_p = \lambda_o - w_p =$ platform nutation frequency CONTROL LAW: $T_{motor} = K \cos \lambda_p \tau$
ROTOR COORDINATES: $w_{x_R} = w_T \sin \lambda_R \tau$, $w_{y_R} = w_T \cos \lambda_R \tau$ where $\lambda_R = \lambda_o - w_R =$ rotor nutation frequency. Rotor accelerometer signal is proportional to $\theta \cos \lambda_R \tau$ RELATIVE RATE INFORMATION: Platform magnet/rotor coils generate square wave at relative rate $w_{rel} = w_R - w_p y_p =$ antenna boresight.

$I_{prod}$ is in Y-Z plane

The spin torque, $T_m$, applied to the platform is given by $T_m = I_p \dot{w}_p$
where
$I_p =$ platform spin moment of inertia
$\dot{w}_p =$ platform spin acceleration
The reaction torque, $I_R$, exerted by the platform dynamic imbalance on the spacecraft is given by $$T_R = I_{prod} \dot{w}_p = T_m \frac{I_{prod}}{I_p}$$

where
$I_{prod} =$ platform product of inertia
Since the control law insures that the magnitude of $T_R$ varies as a cosine at platform nutation frequency on a platform fixed axis and the projection of the transverse rate, $w_T$, on this same axis varies as a cosine with a 180° phase reversal, the average reaction torque tending to reduce the transverse rate over one nutation period is $$(T_R) = \frac{|T_m|}{2} \frac{I_{prod}}{I_p}$$

The average rate of change of the transverse rate per nutation period is, therefore, $$\dot{w}_T = \frac{(T_R)}{I_T} = \frac{|T_m|}{2I_T} \frac{I_{prod}}{I_p}$$

where
$I_T =$ spacecraft transverse moment of inertia Noting that the transverse rate is defined by $w_T = H\theta/I_T$ where
$H =$ spacecraft spin angular momentum
$\theta =$ nutation angle,
the damping time constant, $\tau$, is defined as $$\tau = \frac{w_T}{\dot{w}_T} = 2H \frac{I_p}{I_{prod}} \frac{\theta}{|T_m|}$$

Since the magnitude of motor torque is proportional to $\theta$ by mechanization, the time constant is the same until saturation. When the latter takes place, the resulting motor torque square wave will generate a damping time constant that degrades linearly with nutation, that is $$\tau_{sat} = \frac{\pi}{2} H \frac{I_p}{I_{prod}} \frac{\theta}{|T_m|_{max}}$$

The sinusoidal motor torque will introduce a sinusoidal platform azimuth error, $\alpha$, in the presence of nutation given by $$\alpha = \frac{|T_m|}{I_p \lambda_p^2}$$

such that in the linear range of application $$\frac{\alpha}{\theta} = \frac{2I_T^2}{HI_{prod}\tau}$$

where
$\lambda_p = H/I_T$ for the case of a despun platform.
For typical applications, $\alpha/\theta$ can be maintained on the order of 1 so that residual azimuth motion is negligibly small and damping performance is equal or better than state-of-the-art nutation dampers.

It should be understood that variations may be made. The nutational motion may be sensed with inertial instruments other than an accelerometer, said instruments being suitably placed at various locations on the spacecraft. For example, a rate gyro may be placed on the rotor and oriented such that it measures $\omega_x$ or $\omega_y$. The use of a rate gyro to sense nutation may be less satisfactory than the use of a flexure mounted accelerometer because the rate gyro involves a rotating mechanism which is inherently less reliable.

Figure 6:
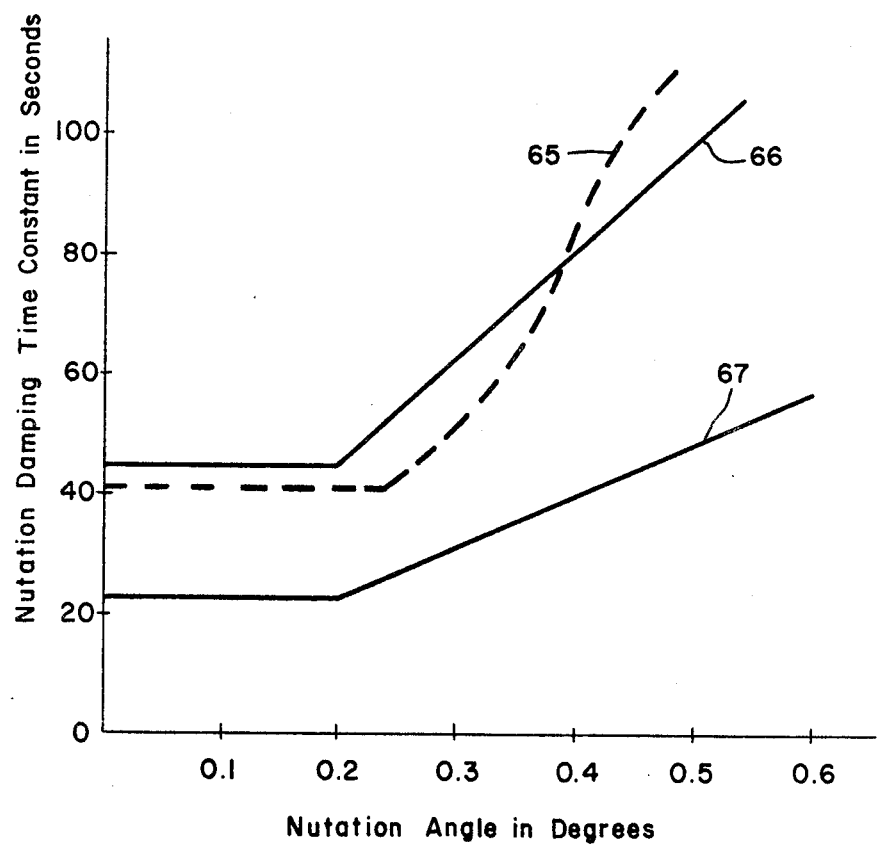
FIG. 6 is a chart comparing the performance of the nutation control system of the present invention with a conventional pendulum-type nutation damper.

FIG. 6 is a chart comparing the performance of the nutation control system of the present invention with the conventional pendulum type nutation damper, and shows nutation damping time constant in seconds versus nutation angle in degrees. The conventional pendulum type damper performs as indicated by curve 65. This assumes resonant conditions, and the performance of the pendulum type damper is uncertain after the pendulum begins to hit the stops, which begins at approximately a nutation angle larger than 0.25°. Curve 66 shows the performance of the nutation damping system of the present invention where the despin motor has a maximum torque of 0.75 foot pounds, which may be employing one motor driver. Curve 67 shows the performance of the nutation damping system of the present invention where the despin motor has a maximum torque of 1½ foot pounds, or where two motor drivers are used. As can be seen, the nutation damping system of the present invention has a performance that degrades gradually and predictably under saturated conditions, and has a performance which is equal to or better than the performance of the pendulum type damper up to saturation conditions.

It is to be understood that the above described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A nutation control system for a dual-spin stabilized device having a rotor, a platform, a despin motor, a relative rate sensor and a nutation sensor, in which the invention comprises a modulator coupled to the output of said relative rate sensor and to the output of said nutation sensor for modulating the signal from said nutation sensor with the signal from said relative rate sensor, the output of said modulator being coupled to said despin motor to cause said motor to apply a torque to said device to reduce the amount of nutation.

2. A nutation control system comprising:
   a dual-spin stabilized device having a rotor, a platform and a despin motor;
   a relative rate sensor disposed on said device for sensing the relative rate of rotation of said rotor and said platform;
   a nutation sensor disposed on said device for sensing nutation; and
   a modulator coupled to the output of said relative rate sensor and to the output of said nutation sensor for modulating the signal from said nutation sensor with the signal from said relative rate sensor, the output of said modulator being coupled to said despin motor to cause said motor to apply torque to reduce the nutation.

3. A nutation control system comprising:
   a rotor adapted to spin about a spin axis,
   a body rotatably coupled to said rotor,
   a despin motor disposed on said rotor and coupled to said body for controlling relative rotation,
   a relative rate sensor disposed on said rotor for sensing the relative rate of rotation,
   a nutation sensor disposed on said rotor for sensing nutation, and
   a modulator coupled to the output of said relative rate sensor and to the output of said nutation sensor for modulating the signal from said nutation sensor with the signal from said relative rate sensor,
   the output of said modulator being coupled to said despin motor to cause said motor to apply torque to reduce the nutation.

4. A nutation control system comprising:
   a rotor adapted to spin about a spin axis,
   a body rotatably coupled to said rotor,
   a despin motor disposed on said rotor and coupled to said body for controlling the relative rotation of said body with respect to said rotor,
   a relative rate sensor for generating a aquare wave indicative of the relative rate of rotation of said body with respect to said rotor comprising a magnet disposed on said body and a pair of coils disposed on opposite sides of said rotor adjacent to the path of said magnet,
   an accelerometer for sensing nutation disposed on said rotor and aligned parallel to said spin axis and displaced therefrom the generating in response to nutation a sine wave at rotor nutation frequency,
   a filter coupled to the output of said accelerometer,
   a modulator coupled to the output of said filter and said relative rate sensor for modulating the sine wave from said accelerometer with the square wave from said relative rate sensor, and
   circuit means providing filtering and gain coupling the output of said modulator to said despin motor.

* * * * *